United States Patent [19]

Kurokawa et al.

[11] Patent Number: 5,370,292
[45] Date of Patent: Dec. 6, 1994

[54] MAGNETIC TAPE DRIVING MECHANISM HAVING A CAPSTAN WITH A SURFACE MADE OF CARBON FILM INCLUDING DIAMOND-BONDED CARBONS

[75] Inventors: Hideo Kurokawa, Katano; Tsutomu Mitani, Akashi; Hirokazu Nakaue, Higashiosaka; Hideaki Yoshio, Moriguchi; Hideyuki Hashi, Kadoma; Yuji Nakamura, Hirakata, all of Japan

[73] Assignee: Matsushita Electric Industrial Co., Ltd., Osaku, Japan

[21] Appl. No.: 118,695

[22] Filed: Sep. 10, 1993

Related U.S. Application Data

[63] Continuation of Ser. No. 752,011, Aug. 29, 1991, abandoned.

[30] Foreign Application Priority Data

Aug. 29, 1990 [JP] Japan .................. 2-229400
Nov. 19, 1990 [JP] Japan .................. 2-313501
Dec. 25, 1990 [JP] Japan .................. 2-405741

[51] Int. Cl.$^5$ ............................ B65H 20/00
[52] U.S. Cl. .................... 226/190; 226/193; 492/59
[58] Field of Search ............. 226/190, 193; 242/76; 492/54, 59

[56] References Cited

U.S. PATENT DOCUMENTS 3,106,319 10/1963 Fischer .................. 226/193
4,635,877 1/1987 Oishi et al. ............. 242/76 X
4,794,680 1/1989 Meyerhoff et al. ........ 219/121.69 X

FOREIGN PATENT DOCUMENTS 1280317 9/1965 Germany .
59-38956 3/1984 Japan .
59-148174 8/1984 Japan .
62-139873 6/1987 Japan .
2126459 5/1990 Japan .
2-199653 8/1990 Japan .
2-274876 11/1990 Japan .
3201244 9/1991 Japan .
1136274 5/1966 United Kingdom .
2100912 1/1983 United Kingdom .

OTHER PUBLICATIONS

"Hi-Fi Tape Recorder", Radio Gijutsusha, Nov. 10, 1969, pp. 194-195.
"The Collection of Papers for Scientific Lectures at the Convention of the Precision Engineering Institution of Japan", vol. 3, p. 621, Autumn/1989.
"Application of Diamond Like Carbon Films to Metallic Thin Film Magnetic Recording Media" by Kurokawa et al., IEEE Transactions on Magnetics, vol. Mag-23, No. 5, Sep. 1987, pp. 2410-2412.

*Primary Examiner*—Clifford D. Crowder
*Assistant Examiner*—John J. Calvert
*Attorney, Agent, or Firm*—Wenderoth, Lind & Ponack

[57] ABSTRACT

A tape driving mechanism for a magnetic recording apparatus has a capstan rotated to advance a magnetic tape by pinching the magnetic tape between the capstan and a pinch roller. The pinch roller is pressed onto the magnetic tape against the capstan. The capstan surface is coated with a diamond-like carbon film which is smooth and highly wear-resistant. The difference between the tangential speed of the capstan and the tape transfer speed is almost zero. Thus, the state of contact is static. A static frictional coefficient between the diamond-like carbon film of the capstan and the magnetic tape is almost equal to twice the static frictional coefficient between the metal surface of the capstan and the magnetic tape in the conventional tape driving mechanism. The tape driving force thus remains sufficient even if the pressure exerted by the pinch roller is reduced to half the value employed in the conventional tape driving mechanism. The diamond-like carbon film may be coated on a rough surface of the capstan.

10 Claims, 5 Drawing Sheets

MAGNETIC TAPE DRIVING MECHANISM HAVING A CAPSTAN WITH A SURFACE MADE OF CARBON FILM INCLUDING DIAMOND-BONDED CARBONS

This application is a continuation of now abandoned application Ser. No. 07/752,011, filed on Aug. 29, 1991 now abandoned.

BACKGROUND OF THE INVENTION

1. Field of the Invention

The present invention relates to a tape driving mechanism for a magnetic recording apparatus such as a video cassette recorder and a cassette tape recorder. The present invention, in particular, relates to a tape driving mechanism in which a pinch roller is set up to press a magnetic tape against a capstan to pinch the magnetic tape between the pinch roller and the capstan in order to drive the magnetic tape.

2. Description of the Related Art

FIG. 9 shows a conventional tape driving mechanism for a magnetic recording apparatus. FIG. 10 is a sectional view taken on line X—X in FIG. 9. In this mechanism, a pinch roller 2 moves toward a capstan 1 until the pinch roller 2 is pressed against the capstan 1 with a magnetic tape 3 pinched between the pinch roller 2 and the capstan 1. The outer portion of the pinch roller 2, which is rotatable, is made of an elastic material such as rubber. In FIG. 9, when the capstan 1 is rotated in the direction of an arrow A1 by a driver (not shown), the magnetic tape 3 is advanced in the direction of an arrow A3 against a load F.

Since the axial length of the capstan 1 and the axial length of the pinch roller 2 are designed to be greater than the width of the magnetic tape 3, as shown in FIG. 10, the capstan 1 and the pinch roller 2 are in direct contact with each other on both sides of the magnetic tape 3. A mechanism for transferring the driving force to the magnetic tape is made up of an indirect frictional drive mechanism and a direct frictional drive mechanism. In the indirect frictional drive mechanism, the driving force is first transferred from the capstan 1 to the pinch roller 2, which in turn drives the magnetic tape 3 with a frictional force generated between the pinch roller 2 and the magnetic tape 3. In the direct frictional drive mechanism, the capstan 1 directly drives the magnetic tape 3 with a frictional force generated between the capstan 1 and the magnetic tape 3. The capstan 1 is conventionally made of a metal, and the outer portion of the pinch roller 2 is usually made of rubber whose frictional coefficient is far greater than that of the metal. The pinch roller 2 has a diameter far larger than that of the capstan 1; thus, the contact area of the pinch roller 2 with the magnetic tape 3 is naturally larger than the contact area of the capstan 1 with the magnetic tape 3. This suggests that the indirect frictional drive mechanism plays a greater role in driving the magnetic tape 3 than the direct frictional drive mechanism. It should be noted that rubber is in general less uniform in hardness than metal. The greater role the indirect frictional drive mechanism plays, the more the rubber portion of the pinch roller 2 pronounces its effect of uneven hardness. As a result, stable tape advance may be impaired.

A factor which determines the magnitude of frictional forces in these frictional drive mechanisms is the pressure the pinch roller 2 exerts onto the capstan 1. An appropriately large pressure is required to obtain a sufficient tape driving force. A force of 1 kg or more is usually exerted in the prior art technique. In an apparatus like a video cassette recorder which uses a tape driving mechanism such as this conventional one, substantial limitations as described below arise, in particular in realizing compact and light-weight design.

To realize a compact and light-weight apparatus, any mechanical parts and other parts integrated into a chassis should be miniaturized to their extremes. If, in such the miniaturized structure, the pressure the pinch roller exerts remains as large as a pressure in the conventional mechanism, mechanical parts, such as the pinch roller arms, suffer from warpage or deformation, thereby impairing the operation of the apparatus. Since the bearings employed in the capstan is also miniaturized in their construction, their allowable load is accordingly small. If the pressure the pinch roller exerts is as large as in the conventional mechanism, the service life of the bearings may be shortened. To miniaturize the apparatus, therefore, the pressure the pinch roller 2 exerts onto the capstan. 1 should be as small as possible. The indirect frictional drive mechanism is a major driving force transmission mechanism, as already mentioned. If a large pressure is exerted, however, the rubber portion of the pinch roller quickly wears and deteriorates. As a result, the stable operation of tape advance will soon be impaired.

Conversely, if the pressure which the pinch roller 2 exerts onto the capstan 1 is set too small in the conventional tape driving mechanism, no sufficient frictional force occurs between the capstan 1, the pinch roller 2, and the magnetic tape 3. Slippages take place between the capstan 1, the pinch roller 2, and the magnetic tape 3, leading to unstable tape advance. The apparatus does not provide the performance originally intended. Its reliability is destroyed.

Japanese Laid-Open Patent Publication 2-199653 discloses a mechanism wherein a capstan has irregularities on its surface. According to the disclosure, the capstan has grains of 1-100 μm diameter stuck to its surface in order to provide a larger frictional coefficient between the capstan and the magnetic tape. See FIG. 11. The disclosure states that this method assures a stable tape advance. In this method, however, a thin magnetic tape is naturally deformed in accordance with the irregularity of the capstan surface when the pinch roller exerts pressure, and a large frictional coefficient results between the magnetic tape and the pinch roller as well. The disclosure fails to mention how much of an increase in frictional force this method offers by means of the direct frictional drive mechanism and how much by means of the indirect frictional drive mechanism. Japanese Laid-Open Patent Publication 2-199653 does not analyze the tape driving mechanism from the above point of view. The disclosure also suggests impressing or sandblasting to form irregularity on the capstan surface. These methods are not satisfactory from the standpoint of durability, according to the disclosure.

SUMMARY OF THE INVENTION

The present invention overcomes the above-mentioned problems arising from the conventional tape driving mechanism.

Accordingly, an essential object of the present invention is to provide a tape driving mechanism for magnetic recording apparatus in which a direct frictional drive mechanism plays a major role in tape driving, regardless of the use of a smooth-surfaced capstan, and limiting the role in tape driving by of an indirect frictional drive mechanism to a minimum. The a pressure which a pinch roller exerts is set to a minimum, while keeping a sufficient tape driving force assured. Both a stable tape advance operation and a sufficient durability of the tape driving mechanism are realized, and consequently the magnetic recording apparatus is miniaturized.

In accomplishing these and other objects, according to the present invention, there is provided a tape driving mechanism for the magnetic recording apparatus comprising a capstan and a pinch roller. The capstan rotates at a fixed speed, and the capstan surface, the portion of which is in contact with the magnetic tape, is coated with a diamond-like carbon film. At least the outer portion of the pinch roller is made of an elastic member, and the pinch roller rotates while it is pressed onto a magnetic tape against the capstan.

Although it is noncrystal, the diamond-like carbon film has characteristics similar to those of diamond. The diamond-like carbon film is made of both diamond-bonded (SP3 bonded) carbon and graphite-bonded (SP2 bonded) carbon, and the characteristics of the diamond-like carbon film are related to the ratio of diamond bonded carbon to graphite bonded carbon. Specifically, the more the diamond-bonded carbon is included, the more the film becomes similar to diamond. More hardness thus results. The diamond-like carbon film is known as a chemically stable and low frictional coefficient material. As a protective film, the diamond-like carbon film is applied to an area where severe wear takes place. In fact, the diamond-like carbon film varies in its friction coefficient with the speed applied. Particularly, the diamond-like carbon film presents a large static frictional coefficient, and when the film is slid at an extremely slow speed, it presents a large dynamic frictional coefficient. The diamond-like carbon film has an excellent wear resistance. The diamond-like carbon film, coated on the surface of the capstan, which rotates at a relative speed of about zero with respect to the speed of the magnetic tape, works as a high frictional coefficient material rather than a low-frictional coefficient material. Even if the pressure exerted by the pinch roller is substantially lowered, a sufficient tape driving force can still be maintained. Further, thanks to its excellent wear resistance, the diamond-like carbon film can keep the tape driving force maintained at a satisfactory level for a long period of service time. If the diamond-like carbon film is coated onto a capstan surface which has, has beforehand been provided with irregularities by means of an impressing or a sandblasting, an even higher frictional coefficient is expected, at no expense to the durability of the capstan. Since the pinch roller is in contact with the magnetic tape in the same manner as in the conventional mechanism, a lower pressure by the pinch roller suggests that the role which the indirect frictional drive mechanism plays in the tape driving is smaller. In such a condition, a sufficient tape driving force is still maintained, and the direct frictional drive mechanism plays a major role in driving the magnetic tape because of the high frictional coefficient of the diamond-like carbon film. The major role played by the direct frictional drive mechanism means stable and long-time operation of the tape advance.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
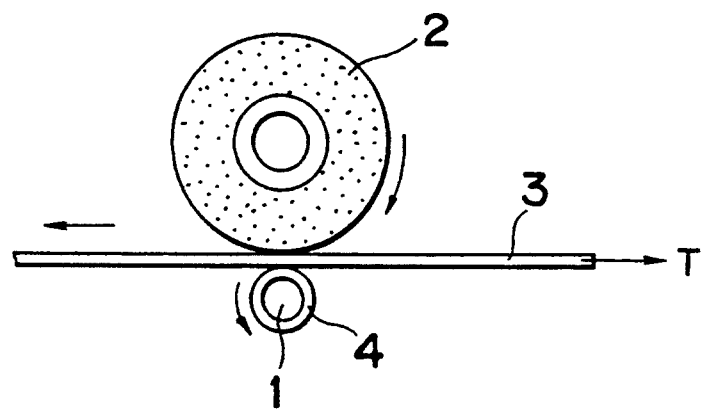
FIG. 1 is a plan view showing the structure of a first embodiment according to the present invention.

Before the description of the present invention proceeds, it is to be noted that like parts are designated by like reference numerals throughout the accompanying drawings.

Figure 2:
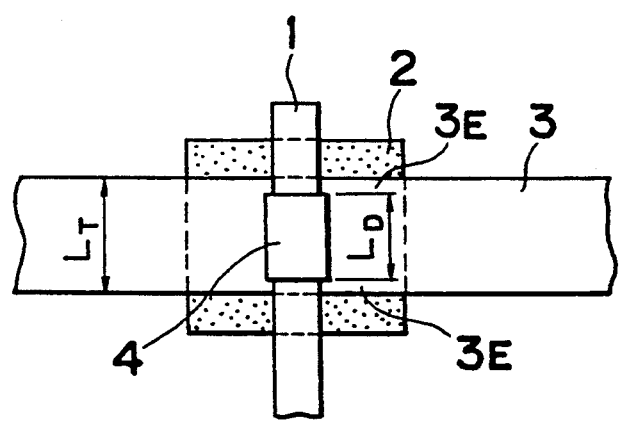
FIG. 2 is a front view showing the structure of the first embodiment according to the present invention.

Referring first to FIG. 1 through FIG. 8, the embodiments according to the present invention are described below. When some members in FIG. 1 through FIG. 8 have identical functions to those in FIG. 9, the same reference numeral is commonly used to identify such a member. No description is provided for those members, because they are already described. FIG. 1 is a plan view showing the structure of a first embodiment according to the present invention. FIG. 2 is a front view of FIG. 1. A capstan 1, shown in FIG. 1 and FIG. 2, is made of non-polar stainless steel, the Vickers hardness Hv of which is about 500 kg/mm$^2$, or made of equivalent steels. The capstan 1 is coated with a 0.2 $\mu$m thick diamond-like carbon film 4, the Vickers hardness Hv of which is 3000 kg/mm$^2$. A variety of methods to form a diamond-like carbon film have been reported (see Japanese Laid-Open Patent Publication 62-139873). Employed in the embodiments is an ionized vapor deposition (see the Collection of Papers for Scientific Lectures at the Convention of the Precision Engineering Institution of Japan, Vol. 3, p. 621, Autumn/1989). In the ionized vapor deposition, thermoelectrons given off by heated filaments are used to ionize a sample gas to its plasma state, and, then, ions in the plasma are used to deposit a diamond-like carbon film. As a sample gas, a hydro-carbon gas like $CH_4$ or $C_6H_6$ is used. In the embodiments here, $C_6H_6$ is used.

Figure 3:
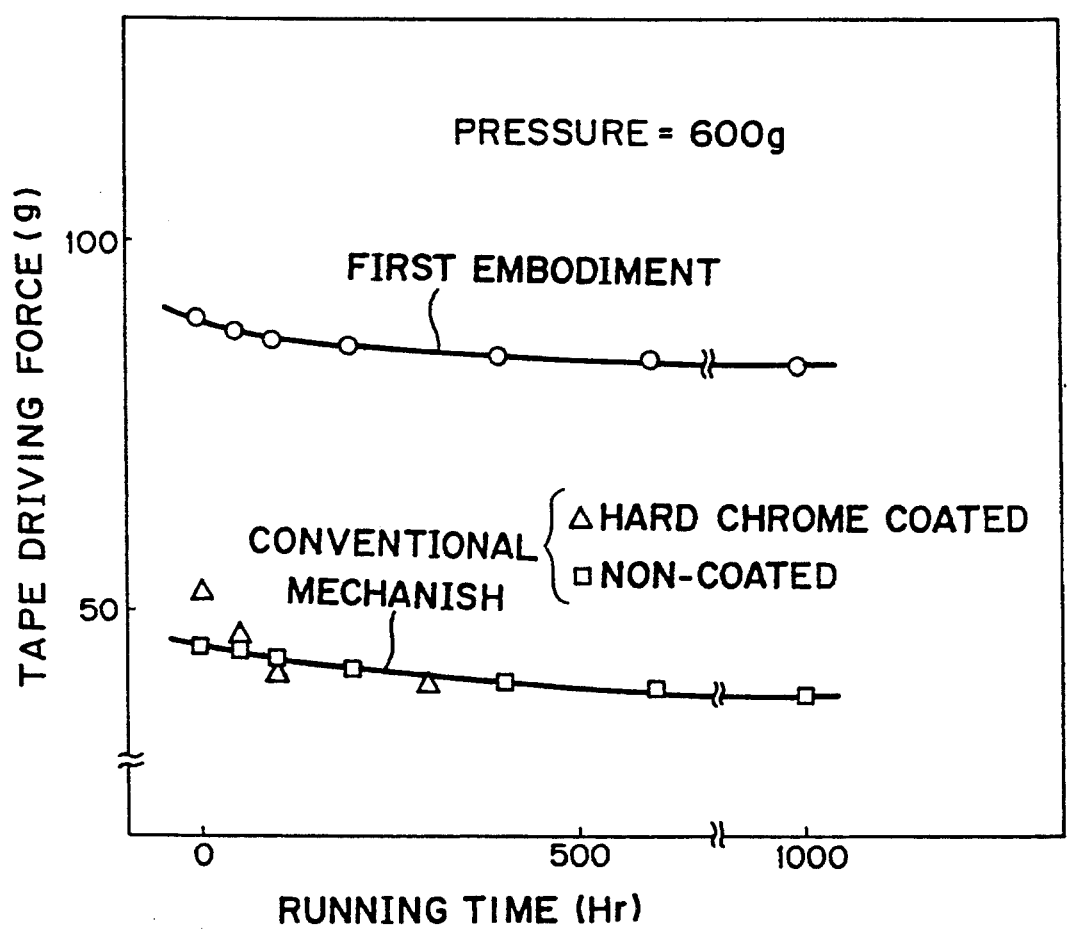
FIG. 3 is a graph showing tape driving force characteristics in the first embodiment according to the present invention.

For comparison, FIG. 3 shows tape driving force data obtained from the tape driving mechanism according to the first embodiment and other tape driving force data resulting from the conventional tape driving mechanism. The result of the conventional mechanism represents two cases, one obtained from a hard chrome coated capstan and the other obtained from a non-coated metal capstan. The tape driving mechanism of the first embodiment differs from the conventional tape driving mechanism in that the tape driving mechanism of the first embodiment has the capstan 1 coated with the diamond-like carbon film 4. The horizontal axis in FIG. 3 represents the running time of the magnetic tape. The vertical axis represents the tape driving force. Described below are the definition of the tape driving force and how it is measured. The pressure which the pinch roller 2 exerts onto the capstan 1 is set to a constant value, and the magnetic tape 3 is run against a tape load T. The tape load T is varied until a 0.5% relative speed (slippage) takes place between the capstan tangential speed and the magnetic tape transfer speed. The tape driving force is defined as the tape load T which causes a 0.5% relative speed.

Although in the tape driving mechanism according to the first embodiment the pressure exerted by the pinch roller 2 is lowered to 600 g, almost to half the value in the conventional mechanism, a tape driving force of about 80 g still results, as shown in FIG. 3. Such a magnitude of the tape driving force is about twice the driving force resulting from the conventional mechanism. Furthermore, the driving mechanism according to the first embodiment substantially maintains its initial level of the driving force and its stable operating conditions even after 1000 hours of running time. The present invention allows the pressure by the pinch roller to be half the value than in the conventional mechanism, and the tape driving force can thus be maintained for a long service time.

In contrast to this, the conventional tape driving mechanism, which has no diamond-like carbon film, offers only about 40 g, which is not sufficient.

Described below is how such an effect takes place because of the diamond-like carbon film coated capstan 1.

The main reason a relatively small pressure causes a relatively large tape driving force is that the diamond-like carbon film works on the magnetic tape as a high frictional coefficient material.

Figure 4:
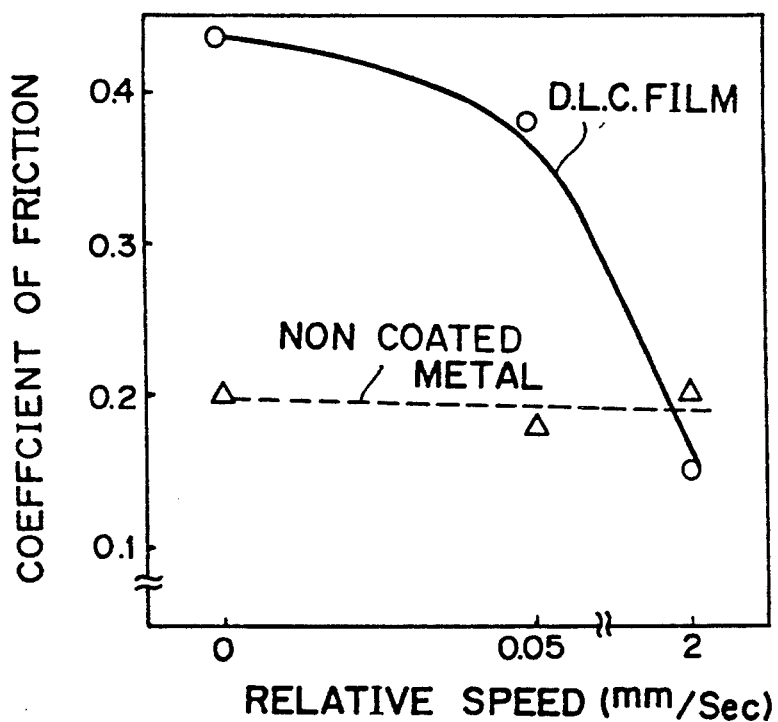
FIG. 4 is a graph showing dynamic frictional coefficient characteristics.
Figure 5:
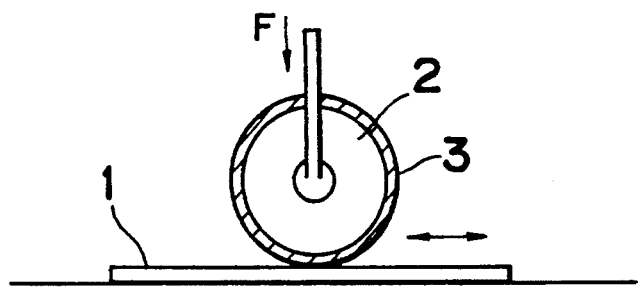
FIG. 5 is a front view showing a test setup for measuring dynamic frictional coefficients.

The diamond-like carbon film is generally known as a low frictional coefficient material. When a dynamic frictional coefficient is measured in a method mentioned later, and when the diamond-like carbon film is slid at a relative speed of about 2 mm/sec, the dynamic frictional coefficient is 0.15, as shown in FIG. 4. The coefficient of 0.15 is smaller than that of a non-coated metal capstan with respect to a magnetic tape. For comparison, when a capstan is neither coated with diamond-like carbon film nor with other hardening means such as a hard chrome coating, its dynamic frictional coefficient is about 0.2. The dynamic frictional coefficient sharply increases as the diamond-like carbon film coated capstan decreases its relative speed with respect to the tape toward zero, as in FIG. 4. Both the static and dynamic frictional coefficients of the diamond-like carbon film with respect to the magnetic tape are approximately almost twice those of stainless steel or its equivalents with respect to the magnetic tape.

In a tape driving mechanism where a tape advances almost at the same speed as the tangential speed of a capstan, the diamond-like carbon film, known as a low frictional coefficient material, serves as a high frictional coefficient material. Consequently, the present invention offers a tape driving force of twice the tape driving force given in the conventional tape driving mechanism. The reason the tape driving force, according to the present invention, is maintained almost at its initial level for a substantially long period of time is that the diamond-like carbon film is both wear-resistant and physically stable. The first embodiment thus offers excellent characteristics as a result of the diamond-like carbon film's high wear-resistance and high frictional coefficient combined. Test results plotted in FIG. 4 were obtained in a setup illustrated in FIG. 5. More specifically, the pinch roller 2, which the magnetic tape 3 wraps, is pressed against the capstan 1 with a constant force F. Under this setup, the frictional coefficient was measured by sliding the pinch roller 2 and the capstan 1 at a fixed speed. Measurements were made to both one capstan coated with the diamond-like carbon film, according to the first embodiment, and the other, non-coated, one according to the conventional mechanism.

In the present invention, it may be desired that the diamond-like carbon film 4 is 0.05 $\mu$m or more. The diamond-like carbon film 4 coated on the capstan wore away by 0.05 $\mu$m to 0.08 $\mu$m after a running time of about 1000 hours, though such a range of wear may be marginally exceeded depending on the operating conditions. The diamond-like carbon film of 0.05 $\mu$m or more thus practically assures a sufficient service life.

Figure 6:
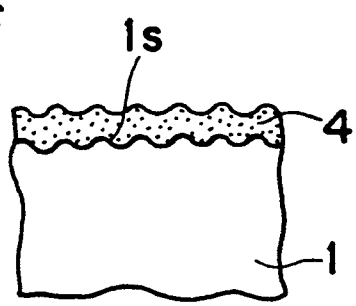
FIG. 6 is a cross-sectional view showing the structure of a second embodiment according to the present invention.

In the first embodiment, an axial width $L_D$ of the diamond-like carbon film is greater than a width $L_T$ of the magnetic tape. The capstan 1 has no such irregularities as shown in FIG. 6. Regardless of introduction of the diamond-like carbon film onto the capstan 1, practically no change takes place in the geometry of the contact between the pinch roller 2 and the magnetic tape 3, and the geometry of the contact between the pinch roller 2 and the capstan 1. This means that a sharp increase in the tape driving force in the first embodiment occurs as a result of the capstan's diamond-like carbon film, which is in direct contact with the magnetic tape. It is now apparent that the first embodiment allows the tape driving force to transfer from the capstan 1 directly to the magnetic tape 3.

Now described below is a second embodiment according to the present invention. The second embodiment has a structure identical to the one shown in FIG. 1, except with a difference as described below. In the second embodiment, the surface ls (FIG. 6) of the capstan is a surface having a fine irregularity of the surface-roughness, at 0.5 $\mu$mRz, and, further, on the irregular surface ls, the capstan 1 is coated with a diamond-like carbon film 4 0.2 $\mu$m thick and of a Vickers hardness of 3000 kg/cm$^2$. The second embodiment also uses ionized vapor deposition to form the diamond-like carbon film as in the first embodiment. Because of its good bonding capability, in the second embodiment the external surface of the diamond-like carbon film 4 is as rough as the substrate surface ls, reflecting the irregularity of the substrate surface ls. The second embodiment thus allows the tape driving force to increase even more due to a combined high frictional coefficient effect and a rough surface effect. In this case also, the diamond-like carbon film's high wear-resistance offers a long service time keeping the geometry of the rough surface in its original state, and thus providing a high tape driving force.

Figure 7:
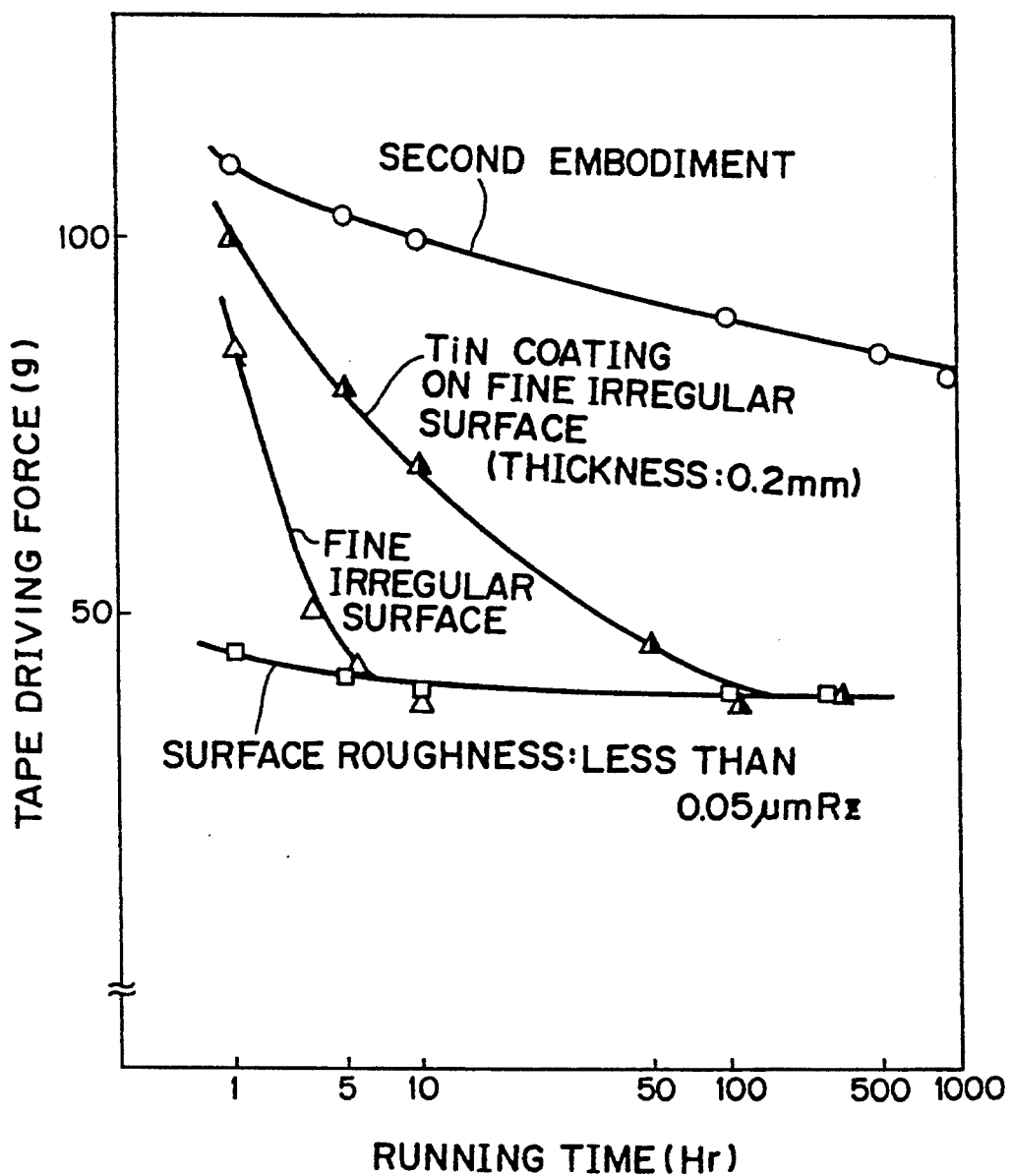
FIG. 7 is a graph showing tape driving force characteristics in the second embodiment according to the present invention.

FIG. 7 shows test results obtained from the second embodiment by plotting results on a running time versus tape driving force graph. Accompanying these results are the results obtained from the non-coated metal capstans in the conventional tape driving mechanism. The setup and operational conditions used here remain unchanged from those in the first embodiment. The test results of the conventional tape driving mechanism in FIG. 7 include those from three different capstans: a first capstan has a non-coated metal surface of which the surface-roughness is 0.05 μmRz or smaller; a second capstan has a non-coated metal surface of which the surface-roughness is 0.5 μmRz; and a third capstan, having a surface-roughness of 0.5 μmRz at its substrate surface, has a surface finish of a 0.2 μm thick titanium nitride film coating. Each of the conventional capstans shows a rapid decrease in the tape driving force as the running time increases. Naturally their service life is far from satisfactory. In contrast, the second embodiment with the diamond-like carbon film substantially prolonged the service life and dramatically increased the tape driving force. The reason the conventional capstans having a rough surface finish show a rapid decrease in their tape driving force is that the rough surface is worn out fast with running time. In the present invention, it is desired that the capstan 1 has a fine irregularity of surface-roughness at 0.1 to 2.0 μmRz at its substrate surface beneath the diamond-like carbon film. A surface finish of surface-roughness of 0.1 μmRz or more provides a sufficient frictional effect to the diamond-like carbon film, and, restricting the surface-roughness to 2 μmRz or less allows the magnetic tape to be protected from any damage due to an excessively large roughness.

It is further desired that the thickness of the diamond-like carbon film be greater than 0.1 μm but smaller than the surface-roughness (0.5 μmRz in the second embodiment) of the substrate surface of the capstan 1. The diamond-like carbon film of 0.1 μm or thicker assures that it is not worn out even after a running time of 1000 hours or so. And restricting the thickness of the diamond-like carbon film to the surface-roughness of the substrate surface of the capstan allows the diamond-like carbon film to reflect the substrate surface-roughness as much as possible, thereby increasing the tape driving force.

In the present invention, forming a surface-roughness on the capstan surface enhances afterwards the bonding force of the diamond-like carbon film onto the capstan substrate surface. This feature is particularly useful to form a diamond-like carbon film of which the Vickers hardness is of high value. More specifically, the higher the Vickers hardness of the film, the smaller the bonding force the film exhibits because of an increase in its internal stress. Such a bonding deterioration is more pronounced beyond a Vickers hardness of 3500 kg/mm². In the second embodiment, however, the surface-roughness of the capstan extends its bonding surface with the diamond-like carbon film, thereby increasing the van der Waals force acting between the diamond-like carbon film and the substrate surface of the capstan. Bonding is thus reinforced.

Described next is a third embodiment according to the present invention. In the tape driving mechanisms according to the first and second embodiments, the axial length $L_D$ of the diamond-like carbon film is mainly determined by the required tape driving force. For example, when a relatively small tape driving force is required, $L_D$ can be shorter.

Figure 8:
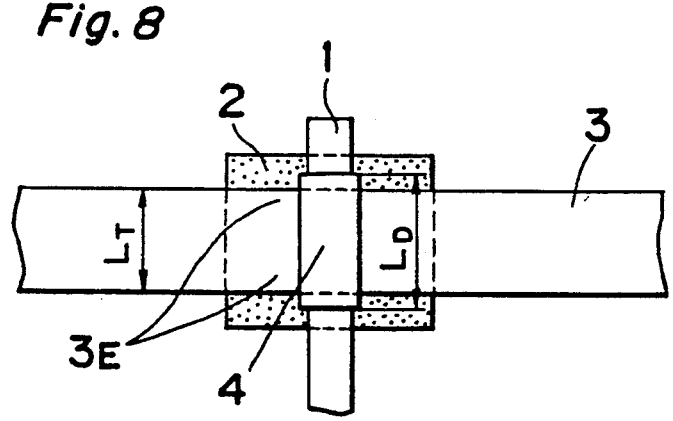
FIG. 8 is a front view showing the structure of a third embodiment according to the present invention.
Figure 9:
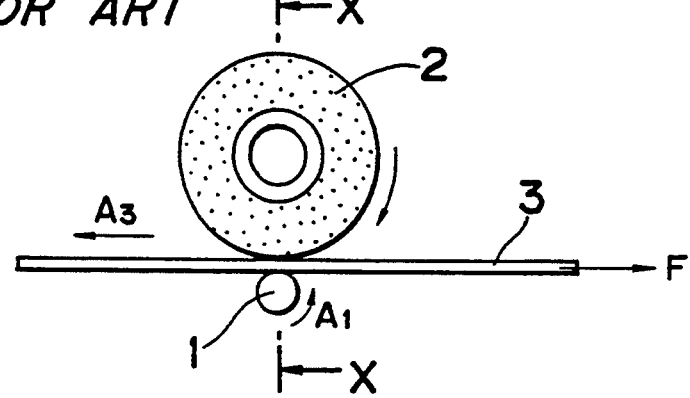
FIG. 9 is a plan view showing the structure of a conventional tape driving mechanism.
Figure 10:
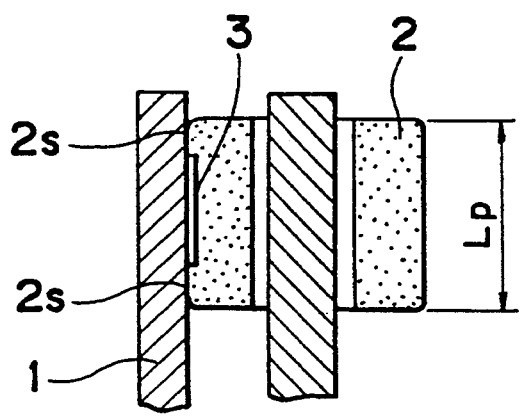
FIG. 10 is a cross-sectional view taken on line X—X in FIG. 9.
Figure 11:
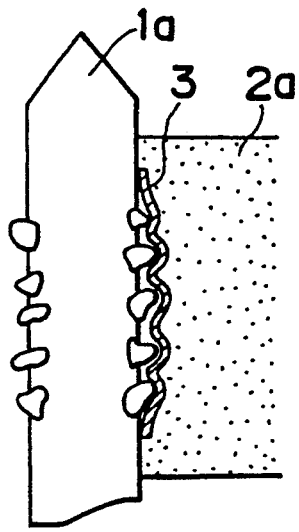
FIG. 11 is a cross-sectional view showing the structure of another conventional tape driving mechanism.

It is advisable to determine $L_D$ by matching the required tape driving force. When the tape driving mechanism according to the present invention is applied to video cassette recorder equipment, the axial length $L_D$ of the diamond-like carbon film is desirably set to a length longer than the tape width $L_T$, as shown in FIG. 8. The reason is as follows: If $L_D$ is smaller than $L_T$ as shown in FIG. 1, both edge portions 3E of the tape are in direct contact with the metal portion of the capstan 1, while the center portion of the tape stays in contact with the diamond-like carbon film formed on the capstan 1. As already described repeatedly, the frictional force resulting from the diamond-like carbon film kept in contact with the tape is almost twice the frictional force resulting from the metal of the capstan kept in contact with the tape. This means that a large imbalance occurs between one frictional force acting on the side portions 3E of the tape and the other frictional force acting on the center portion of the tape. If the same tape is repeatedly run under this condition, the tape expands in an uneven manner between its side portions and its center portion. Such an uneven expansion leads to warpage on the side portions 3E of the tape. Once warpage takes place, more warpages are subsequently generated, probably leading to damage of the tape. The tape edges are used to guide the tape correctly along the leading stages of the drums in the video cassette recorder. If the edge portions are deformed, the tape advances in an unstable manner, impairing the tracking linearity and lowering the fidelity in the playback video signal.

On the other hand, if $L_D$ is set greater than $L_T$ as in FIG. 8, the full width of the tape, including edge portions 3E, remains in contact with the diamond-like carbon film. The tape is subjected to the driving force in a uniform manner. As a result, the above-mentioned problem is overcome, and the reliability of the apparatus is enhanced even more.

Setting $L_D$ greater than $L_T$ enhances the stability and reliability in the tape driving mechanism even when the same tape is repeatedly run. Besides its application in the VCR equipment, the third embodiment is particularly useful to an apparatus wherein a tape is run by putting its edges in contact with a tape guide in a tape transport assembly and another apparatus wherein the full width of a magnetic tape is used for data recording.

Although the ionized vapor deposition is employed to form the diamond-like carbon film in these embodiments, any appropriate method other than the ionized vapor deposition may be employed in the present invention. Also, to reinforce the bonding of the diamond-like carbon film, a layer made of an element selected from titanium nitride carbide (TiNC), titanium carbide (TIC), silicon (Si), silicon carbide (SIC), and the like may be interposed between the diamond-like carbon film and the substrate surface of the capstan. As proposed by Japanese Laid-Open Patent Publication 2-274876, the bonding of the diamond-like carbon may be reinforced by controlling the forming process in a manner that its internal stress is kept smaller at the initial stage of the forming process and then by gradually changing the nature of the film thereafter.

In the tape driving mechanism according to the present invention, it is more desirable that the Vickers hardness Hv of the diamond-like carbon film coated on the capstan is 1500 kg/mm² or more. In practice, a film of a Vickers hardness of 1500 kg/mm² or more provides a sufficient wear resistance capable of maintaining the tape driving force at a satisfactory level for a substantially long period of time. It is also desired that the specific resistance of the diamond-like carbon film is smaller than $1.0 \times 10^4$ Ωcm. A tape having a specific resistance smaller than $1.0 \times 10^4$ Ωcm prevents static electricity from occurring or being stored in the tape. Consequently, noise generation is effectively controlled when playing back a signal stored in the tape.

Applying the tape driving mechanism according to these embodiments in a VHS Standard VCR camera resulted in a dramatically reduced size in design, and a substantially lowered weight. It is also noted that, without using a known control system in a conventional tape driving mechanism, the magnetic tape is kept advanced, with a sufficient design margin, almost at the same speed as the tangential speed of the capstan. The present invention substantially simplifies the design of the tape transport control assembly, or even entirely omits it, eventually leading to a low-cost apparatus. Besides the VCR camera, the present invention definitely offers the same advantage to other kinds of apparatus which comprise a tape driving mechanism.

Although the present invention has been fully described by way of example with reference to the accompanying drawings, it is to be noted here that various changes and modifications will be apparent to those skilled in the art. Therefore, unless such changes and modifications otherwise depart from the scope of the present invention as defined by the appended claims, they should be construed as included therein.

What is claimed is:

1. A magnetic tape driving mechanism, comprising:
   a capstan having a surface made of a carbon film, said carbon film including both diamond-bonded and graphite-bonded carbons, said carbon film having a surface roughness of no more than 2.0 μmRz, and said carbon film being an ionized vapor deposit coated on said capstan; and
   a pinch roller having at least an outer portion thereof made of an elastic member for rotating while being pressed against said capstan with a magnetic tape therebetween.

2. The magnetic tape driving mechanism of claim 1, wherein a relative speed between the surface of said capstan and the magnetic tape is no more than 0.05 mm/sec.

3. The magnetic tape driving mechanism as claimed in claim 2, wherein said pinch roller and said carbon film on said capstan both have axial lengths greater than the full width of the magnetic tape pressed between said capstan and said pinch roller.

4. The magnetic tape driving mechanism of claim 1, wherein said carbon film has a Vickers hardness of at least 1500 kg/mm².

5. The magnetic tape driving mechanism as claimed in claim 4, wherein said pinch roller and said carbon film on said capstan both have axial lengths greater than the full width of the magnetic tape pressed between said capstan and said pinch roller.

6. The magnetic tape driving mechanism of claim 1, wherein said carbon film has a specific resistance smaller than $1.0 \times 10^4$ Ωcm.

7. The magnetic tape driving mechanism as claimed in claim 6, wherein said pinch roller and said carbon film on said capstan both have axial lengths greater than the full width of the magnetic tape pressed between said capstan and said pinch roller.

8. The magnetic tape driving mechanism of claim 1, wherein said carbon film has a thickness of at least 0.1 μm.

9. The magnetic tape driving mechanism as claimed in claim 8, wherein said pinch roller and said carbon film on said capstan both have axial lengths greater than the full width of the magnetic tape pressed between said capstan and said pinch roller.

10. The magnetic tape driving mechanism as claimed in claim 1, wherein said pinch roller and said carbon film on said capstan both have axial lengths greater than the full width of the magnetic tape pressed between said capstan and said pinch roller.

* * * * *